Feb. 18, 1941.          J. J. DUDEK              2,232,102
                         FISH LURE
                    Filed June 7, 1940         2 Sheets-Sheet 1

Inventor
John J. Dudek

By Clarence A. O'Brien

Attorney

Feb. 18, 1941.    J. J. DUDEK    2,232,102
FISH LURE
Filed June 7, 1940    2 Sheets-Sheet 2

Inventor
John J. Dudek

By Clarence A. O'Brien

Attorney

Patented Feb. 18, 1941

2,232,102

UNITED STATES PATENT OFFICE 2,232,102

FISH LURE

John J. Dudek, New Castle, Pa.

Application June 7, 1940, Serial No. 339,362

3 Claims. (Cl. 43—46)

This invention appertains to new and useful improvements in the art of artificial fishing bait and more particularly to a fishing lure plug which has as its principal object the provision of means whereby the lure performs a swimming-like motion when properly set for operation and released in the water.

Another important object of the invention is to provide a lure wherein the parts can be readily repaired or replaced when required.

Other objects and advantages of the invention will become apparent to the reader of the following specification.

In the drawings:

Figure 2 is a side elevational view.

Figure 3 is a transverse section on the line 3—3 of Figure 2.

Figure 7 is a perspective view of the rubber band.

Figure 1:
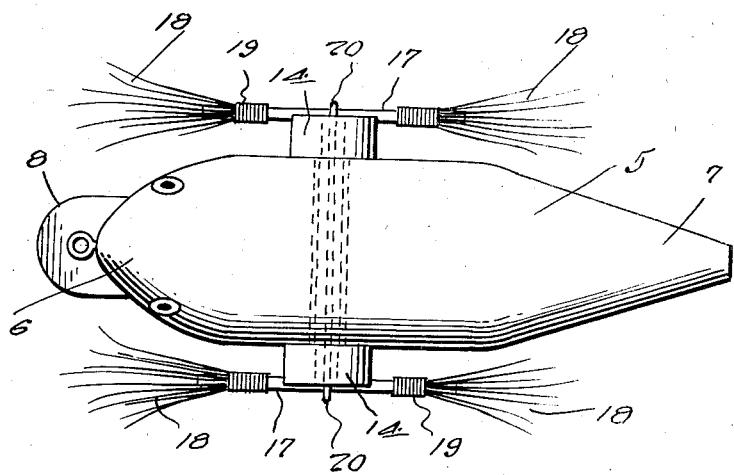
Figure 1 represents a top plan view.
Figure 4:
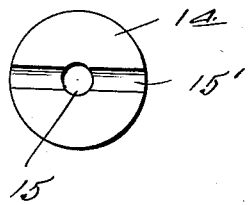
Figure 4 is a side elevational view of one of the cylindrical members of wax.
Figure 5:
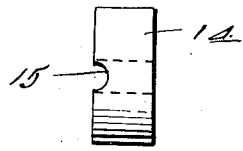
Figure 5 is an edge elevational view of one of the wax members.
Figure 6:
Figure 6 is a perspective view of the sleeve.

Referring to the drawings wherein like numerals designate like parts, it can be seen that numeral 5 denotes the body of the lure which may be of some hard substance preferably wood and which in its shape has the rounded forward head portion 6 and the long tapering tail portion 7. A spoon 8 is suitably attached to the forward portion of the body, and hook units 9 and 10 depend from the forward and tail portions of the body.

In carrying out the present invention, an opening 11 is bored transversely through the body and opposite side portions of the body planed off to provide the flat surfaces 12. Through the bore 11 is disposed a tube 13, preferably of brass, the same terminating at the flat surfaces 12.

In further carrying out the present invention, a cylindrical member 14 of wax is provided for each side of the body 5 and these members 14 have bores 15 therethrough alignable with the opening through the tube 13.

The outer side of each of the wax members 14 has a diametrically disposed groove 15.

For each of the members 14 an arm or swimming unit 16 is provided, this unit consisting of a bamboo stick 17 having bristles, preferably horse tail hairs 18 secured by silk threads 19 to each end thereof.

An elongated rubber band 20 extends through the tube 13 and over the intermediate portions of the said bamboo stick 17, thus snugly holding the bamboo sticks in the grooves 15 of the wax members 14.

By holding one of the wax members 14 and rotating the other, the rubber band 20 can be wound, and obviously when the lure is released in the water it will perform a swimming-like motion which will be highly attractive to game fish.

The purpose in utilizing wax in the members 14 is to somewhat slow down the rotation of the same in their action responsive to the unwinding effect of the rubber band 20.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. A fishing lure comprising a body and swimmer members at each side thereof, each of the said swimmer members consisting of a body of wax and an arm carried by the body of wax and provided with bristles.

2. A fishing lure comprising a body and swimmer members at each side thereof, said body having a tube extending therethrough, a rotatable body of wax, at each side of the first-mentioned body, a rubber extending through the tube and through the bodies of wax, arms disposed against the outer sides of the bodies of wax and over which the rubber band is disposed, and fiber-like projections at the ends of the arms.

3. A fishing lure comprising a body, said body having a transverse opening therethrough, a rotatable body of buoyant material at each end of the opening, fin simulating means on the rotary members, and an elastic member extending through the opening and between the said rotary members.

JOHN J. DUDEK.